United States Patent [19]

Nishimura et al.

[11] Patent Number: 4,657,357
[45] Date of Patent: Apr. 14, 1987

[54] ILLUMINATION SYSTEM FOR SINGLE OBJECTIVE LENS BINOCULAR MICROSCOPE

[75] Inventors: Shinichi Nishimura, Saitama; Nobuaki Kitajima, Tokyo, both of Japan

[73] Assignee: Tokyo Kogaku Kikai Kabushiki Kaisha, Tokyo, Japan

[21] Appl. No.: 790,217

[22] Filed: Oct. 22, 1985

[30] Foreign Application Priority Data

Oct. 23, 1984 [JP] Japan .................. 59-222533

[51] Int. Cl.$^4$ .................. G02B 21/12; G02B 7/18; G02B 27/10; G02B 21/22
[52] U.S. Cl. .................. 350/516; 350/236; 350/447; 350/445; 350/527; 350/523
[58] Field of Search .................. 350/516, 523–528, 350/513, 514, 515, 445, 447, 414, 286, 287, 236, 237, 507, 502

[56] References Cited

U.S. PATENT DOCUMENTS 4,361,379 11/1982 Klein .................. 350/507

FOREIGN PATENT DOCUMENTS 973489 2/1960 Fed. Rep. of Germany ...... 350/236

OTHER PUBLICATIONS

Topcon Operation Microscope—OMS-300 (Booklet).

Primary Examiner—Jon W. Henry
Attorney, Agent, or Firm—Cushman, Darby & Cushman

[57] ABSTRACT

An illumination system is provided for a single objective lens-type binocular microscope. The arrangement features a slot cut in a single objective lens. A prism is inserted into this slot. An illuminating light flux is conducted to the prism at an axis different from the axis of observation through the objective lens. The prism conducts this light to the axis of observation so as to illuminate the area to be observed. Thus, the angle between the illuminating light flux and observing light flux can be made extremely small permitting the deep illumination of the area to be observed.

19 Claims, 14 Drawing Figures

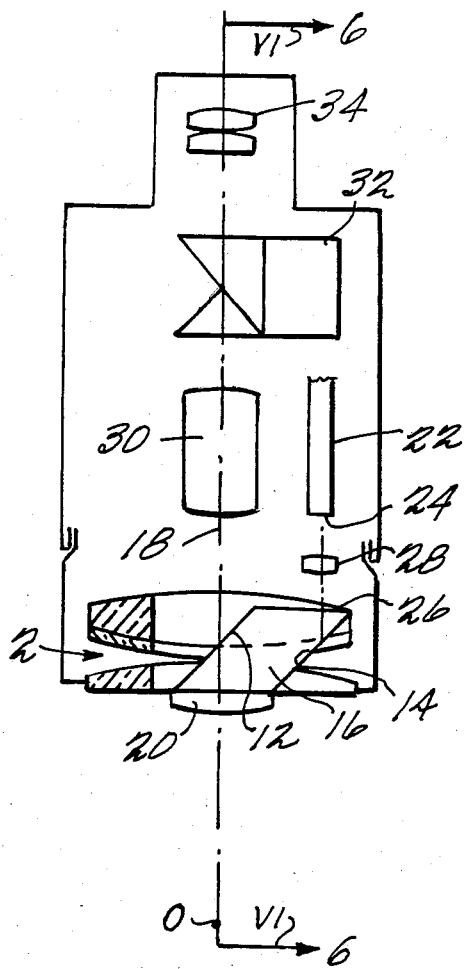
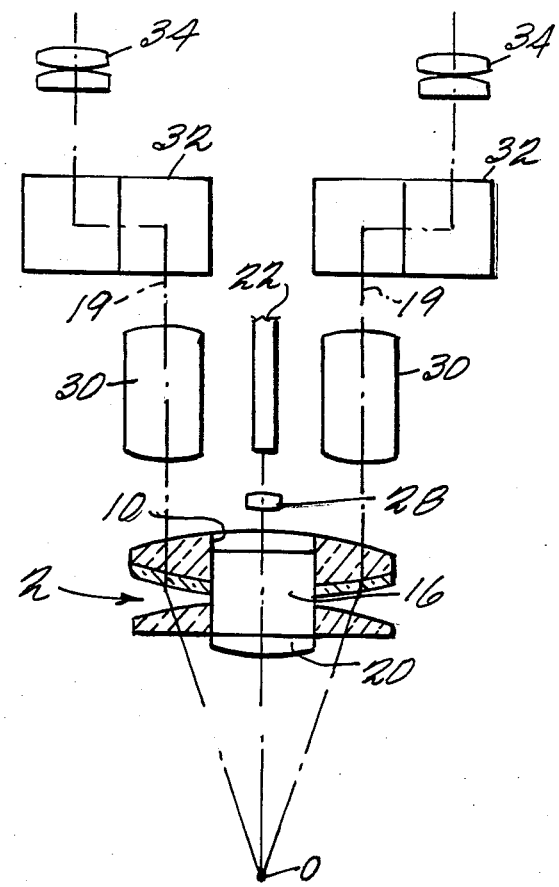
FIG. 5
FIG. 6
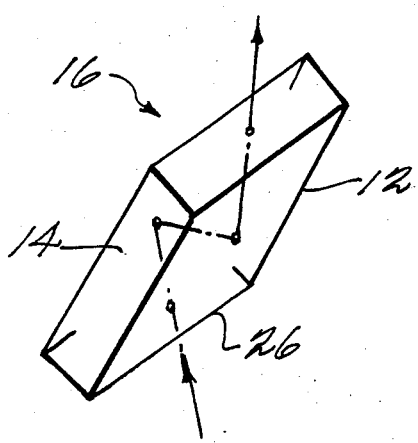
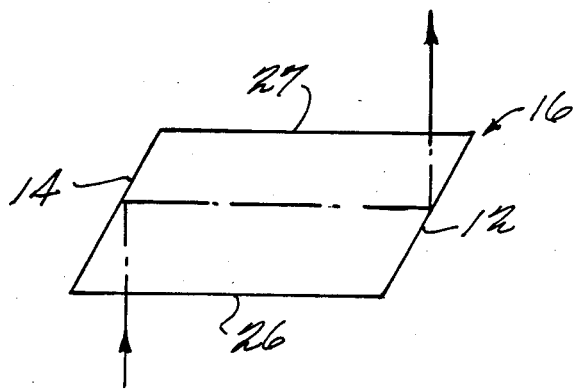
FIG. 7
FIG. 8

ILLUMINATION SYSTEM FOR SINGLE OBJECTIVE LENS BINOCULAR MICROSCOPE

BACKGROUND OF THE INVENTION

This invention relates generally to binocular microscopes. More particularly, the invention is directed to a lens arrangement for illuminating a field of view under microscopic observation at a small angle defined between illuminating and viewing axes or preferably at a zero angle, i.e. along the same optical axis as used for viewing.

Binocular microscopes are used in ophthalmic surgery and in otorhinolaryngologic surgery among other applications. An example of a binocular microscope in the patent literature can be found in U.S. Pat. No. 4,341,435—Lange et al, July 27, 1982. The subject matter disclosed in that patent is hereby incorporated by reference.

In surgical applications, illumination of the surgical site is difficult. Sometimes it is necessary to deeply illuminate a surgical site through a narrow surgical opening. Therefore, it is desirable for the angle between the optical axes of illuminating and observing systems to be as small as possible. If the angle between these axes is too great, the surgical field may not be illuminated to a sufficient depth for many surgical applications.

For example, as shown in FIG. 1 (prior art), in cataract extraction surgery, it is difficult to determine whether any portions of cortex lentis remain at the postaria capsule 240 of an eye after the extraction. The reason for this is that both the crystalline lens 242 and postaria capsule 240 are transparent. A conventional binocular microscope is provided with an illumination system which may illuminate the eye's retina 246 through its iris 250 and postaria capsule 240. The remaining cortex lentis is detected by observing the so-called "red-reflex". This "red-reflex" refers to light reflected from the retina 246 through the postaria capsule which occurs if there are no remaining portions of cortex lentis (all of it was removed during surgery).

In conventional systems wherein the angle 206 between the axis of illumination and the axis of observation is relatively large, the illumination light flux does not sufficiently reach the depth of the surgical site where the retina is found due to obstruction of the illumination light flux by the iris 250 of the eye. Thus, it is difficult to determine whether there are any remaining portions of cortex lentis after performing the cataract extraction.

The problems attendant the prior art will be better understood by continued reference to FIG. 1 (prior art). In a conventional lens arrangement, an illuminating light flux 200 is reflected by a mirror 202 to a peripheral portion 230 of an objective lens 204. This illuminating light flux is converged by lens 204 to form a converged illuminating flux 232 to enter the surgical site (in this case, a human eye). As shown in the drawing, there is an angle 206 which exists between central axes of flux 200 and an observation light flux 208. The larger angle 206 is, the less depth of the surgical site that will be illuminated.

A plan view of lens 204 is shown in FIG. 2 (prior art). This lens is for binocular observation, therefore two portions of observation light flux 208 are shown. The axis of illumination light flux 232 is substantially different from an observation optical axis 210 (shown as a dot in the center of lens 204) directed toward an object to be observed at which both portions of the observation light flux 208 converge.

SUMMARY OF THE INVENTION

To address the illumination problem, the present invention provides a structural arrangement for a binocular microscope which considerably minimizes the angle between the optical axes of illumination and observation with respect to known binocular microscope lens arrangements.

The present invention provides a lens arrangement that permits the optical axes of illumination and the lens arrangement to be coincident. In essence, the invention may provide a "zero" angle of illumination objective lens. This is accomplished by splitting the lens and installing a prism to "channel" illuminating light flux onto the optical axis of the lens (the optical axis of observation). Various embodiments are shown wherein the lens is split in different places and different prism configurations are used.

BRIEF DESCRIPTION OF THE DRAWINGS

The preferred embodiments of the invention will be described in greater detail with reference to the accompanying drawings. Throughout the drawings, like reference numerals denote like or corresponding parts from view to view.

FIG. 5 shows a sectional view of a lens arrangement in accordance with the principles of the present invention for binocular viewing and including an illumination system in accordance with the principles of the present invention;

FIG. 6 is a cut-away view of the lens arrangement taken along VI—VI of in FIG. 5;

FIG. 7 is a perspective view of a prism used in the present invention;

FIG. 8 is a side view of a prism used in the present invention;

DETAILED DESCRIPTION OF THE PREFERRED EMBODIMENTS

The presently preferred embodiment of the invention is best illustrated by FIGS. 3–8.

Figure 3:
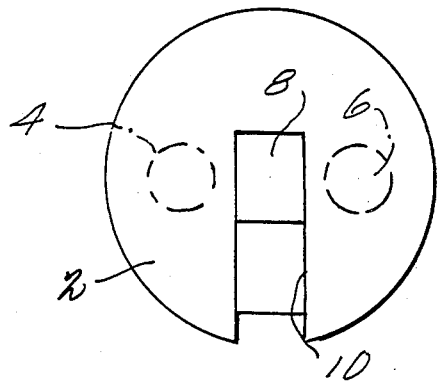
FIG. 3 shows a single objective lens system arrangement in accordance with the present invention.

Referring first to FIG. 3 there is shown a single objective lens system 2 that is longitudinally cut at a central area thereof to define a slot 10. A prism 16 having reflection surfaces 12 and 14 (shown in FIG. 4) is inserted into the slot 10. Objective lens system 2 may receive two bundles of observation flux 4 and 6 at peripheral portions thereof.

Figure 4:
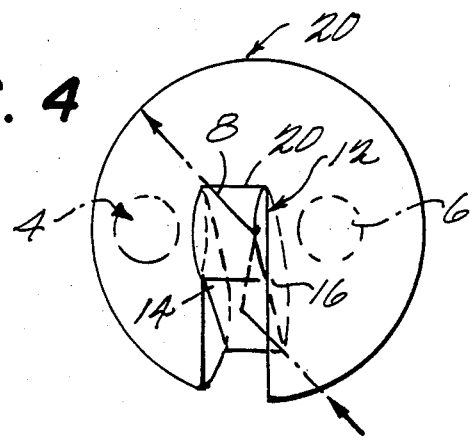
FIG. 4 shows schematically a perspective view of the lens arrangement shown in FIG. 3.

Referring now to FIG. 4, the arrangement of prism 16 can be more readily understood. A condenser lens 20 is fixed on a projection surface of prism 16. Condenser lens 20 has a projection axis 8 which is shown by a dot in FIGS. 3 and 4. Projection axis 8 is coincident with a central axis 18 (shown in FIGS. 5 and 6) of objective lens system 2.

Referring now to FIGS. 5 and 6, the illumination system will be further described. FIG. 5 is a sectional view of a lens arrangement according to the preferred embodiment of the invention and FIG. 6 is a cut-away view taken along line VI—VI of FIG. 5. According to the invention, the single objective lens system can be one lens as shown in FIG. 3 or may include multiple lenses as shown in FIGS. 5 and 6. The illumination light source is not shown. However, light from the illumination source is conducted by a light guide 22 and a condenser lens 28 which is positioned between a projection end 24 of light guide 22 and an incident surface 26 of prism 16. Illumination light flux is transmitted through lens 28 to incident surface 26 of prism 16. The illumination light flux is then reflected at refelection surfaces 12 and 14 of prism 16. The light flux reaches an object "0" to be illuminated through lens 20.

The observation system includes objective lens system 2, a zoom lens system 30, erect prisms 32 and ocular lenses 34. Single objective lens system 2 need not be limited to only one lens element. Rather, single objective lens system 2 may refer to a lens system (as shown in this figure) through which dual or multiple bundles of observation flux may pass as shown in FIGS. 5 and 6.

Objective lens system 2 is adjustable to focus the object "0" at a focal point of the lens. Zoom lens systems 30, prisms 32 and ocular lenses 34 are arranged in symmetry with respect to axis 18 of lens system 2.

Observation light flux from object "0" passes through objective lens system 2. The image of objective "0" is magnified by zoom lens system 30. Each of prisms 32 include four reflection surfaces. Prisms 32 may erect images of observation light flux transferred from zoom lens system 30 and shift an optical path for observation light flux to be parallel with an optical axis 19 of zoom lens system 30. Images of observation light flux are then observed by an operator through ocular lenses 34.

Referring now to FIGS. 7 and 8 there are shown further drawings of prism 16. Illuminating light flux impinges on surface 26 of prism 16. It is reflected by reflection surfaces 12 and 14, and exists at the prism through an exit surface 27 toward condenser lens 20.

Figure 9:
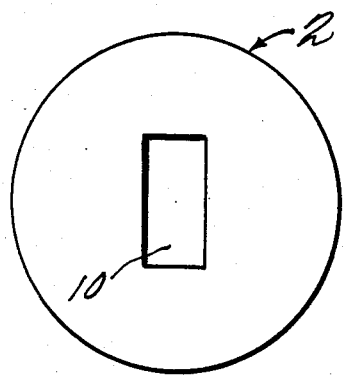
FIG. 9 shows one slot arrangement in accordance with the principles of the present invention.
Figure 10:
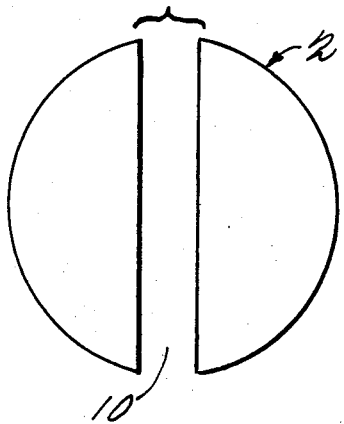
FIG. 10 shows a second slot arrangement in accordance with the principles of the present invention.
Figure 11:
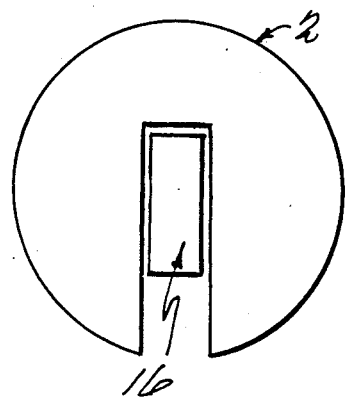
FIG. 11 shows a third slot arrangement in accordance with the principles of the present invention.

Referring now to FIGS. 9, 10 and 11, there are shown various slot arrangements that can be used for slot 10. These arrangements are alternatives to one another. In the FIG. 11 arrangement, the prism would be movably supported in slot 10 formed at a cut-out portion so as to adjust the coincidence of the optical axes of the prism (its illumination axis) with that of single objective lens system 2. In FIG. 11, slot 10 is formed by cutting a peripheral portion of the lens toward its center. Any of the slot arrangements of FIGS. 9–11 could be utilized with the preferred embodiment shown in FIGS. 2–6.

Figure 12:
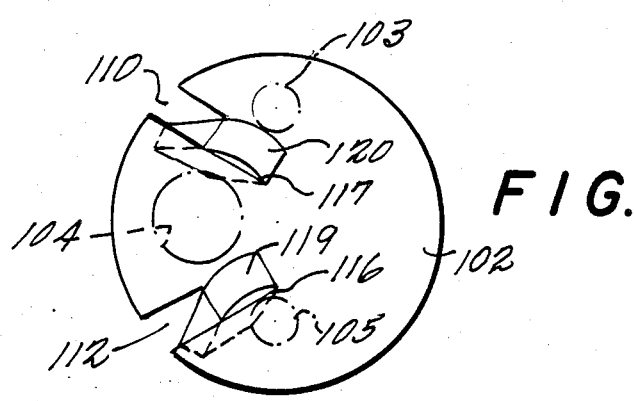
FIG. 12 is a perspective view of a lens arrangement in accordance with the present invention for binocular viewing by two persons simultaneously in accordance with the principles of the present invention.

Referring now to FIG. 12 there is shown an alternative embodiment of the invention for use in a binocular microscope of the type disclosed generally in U.S. Pat. No. 4,341,435, previously cited. This arrangement is suitable for permitting viewing by two operators simultaneously. A single objective lens system 102 includes two cut-out portions 110 and 112 rather than a single slot 10 as shown in the FIGS. 2–6 embodiment. Objective lens system 102 may receive three bundles of observation light flux at peripheral regions 103, 104 and 105. Central peripheral region 104 is larger in size than regions 103 and 105 because it is commonly used for multiple observation.

Objective lens system 102 is longitudinally cut to define two slots 110 and 112 into which prisms 116 and 117 are respectively inserted.

The illumination system are the same as shown in the FIGS. 3–6 embodiment except as follows. A central axis 119 of prism 116 is disposed at an intermediate area between regions 104 and 105 and on the single objective lens system 102 and is set so as to not interfere with the observation flux regions 104 and 105. Central axis 120 of prism 117 is placed at an intermediate area between regions 103 and 104 on the single objective lens system 102, and the prism 117 is also set so as not to interfere with light flux through regions 103 and 104.

Figure 1:
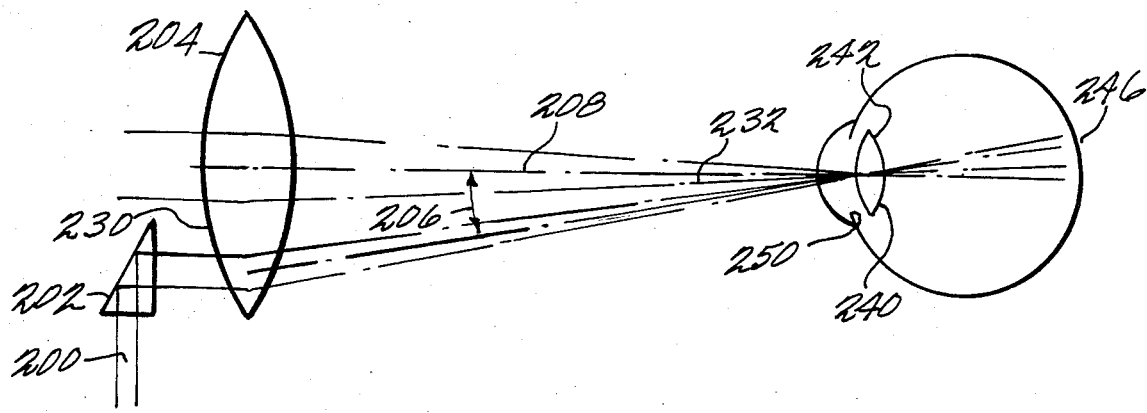
FIG. 1 (prior art) is a schematic diagram illustrating a prior art illuminating arrangement.
Figure 2:
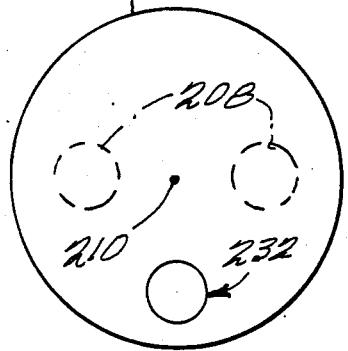
FIG. 2 (prior art) is a plan view of the objective lens shown in FIG. 1 (prior art)

In contrast, axis 8 of the illumination system of the FIGS. 3–6 embodiment is disposed at a intermediate area between regions 4 and 6 as shown in FIG. 1.

The two observer embodiment of FIG. 12 could utilize the various slot arrangement shown in FIGS. 9–11.

Figure 13:
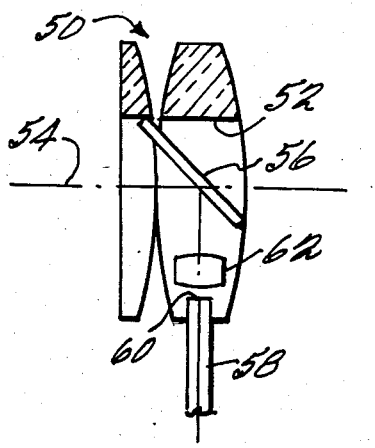
FIG. 13 shows an alternative embodiment of the lens arrangement according to the present invention.

Referring now to FIG. 13 there is shown an alternative embodiment of the invention. The illumination system includes a light guide 58, a condenser lens 62 and a mirror 56. Illuminating light passing through light guide 58 exits by a surface 60 of the light guide. It passes through lens 62 and is reflecting by mirror 56 along an axis 54. The objective lens system is generally denoted by reference numeral 50, the mirror being positioned in cut-out portion 52.

Figure 14:
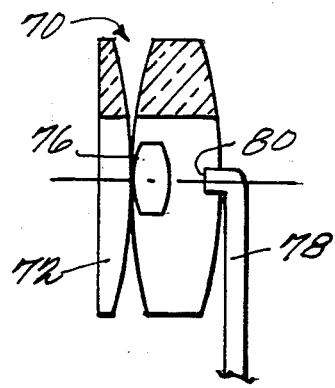
FIG. 14 shows another embodiment of the lens arrangement in accordance with the principles of the present invention.

Referring now to FIG. 14 there is shown an additional alternative embodiment of the invention. The illumination system includes a condenser lens 76 and a light guide 78. The objective lens system is generally denoted by reference numeral 70. Light guide 78 is bent at the point where it enters lens 70. Illuminating light flux conducted by light guide 78 exits at a surface 80 and is conducted through lens 76 to a lens 72 forming a part of lens system 70.

The FIG. 13 embodiment can utilize either of the slot arrangements shown in FIGS. 9 or 10. However, the FIG. 14 embodiment can use any of the slot arrangements shown in FIGS. 9–11.

Having now discussed in greater detail the various embodiments of the invention, its advantages should be more clear. Since the optical axis in a single objective lens system is coincident with that of the illumination system, or the angle defined between the illuminating and observing axes is very small (smaller than in a conventional microscope), illumination light flux can reach deeper portions of the object to be inspected.

This is particularly important in ophthalmic surgery wherein the "red-reflex" (optical reflect from the retina through the postaria capsule if no remaining portions of cortex lentis exists) is sufficiently and clearly observed when the illumination light flux is reflected from the retina and thus is easily detected when performing cataract extraction and interocular lens implantation.

Magnification systems and other accessories for single objective-type binocular microscopes can be the same as those of conventional microscopes. In addition, image quality is not sacrificed for specific configurations of the present invention.

Since a single objective lens system has a cut-out portion or portions wherein an illumination prism is supported, illumination light flux does not introduce any "flare" from the objective lens system which may disturb or interfere with observation light flux. A single objective lens type binocular microscope according to the present invention is relatively simple in construction, has a compact shape, and is easily and inexpensively manufactured.

Other embodiments and modifications of the present invention will be apparent to those of ordinary skill in the art having the benefit of the teachings presented in the foregoing description and drawings. It is therefore to be understood that this invention is not to be unduly limited and such modifications are intended to be included within the scope of the appended claims.

What is claimed is:

1. An objective lens arrangement, comprising:
   an objective lens having a slotted portion;
   light flux deflection means disposed within a slot formed by said slotted portion, said deflection means having at least one reflection surface;
   means for providing an illuminating light flux at said reflection surface of said deflection means, the light flux passing through said deflection means and exiting at said deflection means via its reflection surface, the deflection means being so shaped and positioned that light flux exiting at the deflection means via its reflection surface illuminates a field of view along an axis of illumination that is approximately coaxial with a viewing axis of the lens.

2. A lens arrangement according to claim 1 wherein the slotted portion of the lens is constituted by a cut-out central portion of the lens.

3. A lens arrangement according to claim 1 wherein the slotted portion of the lens is constituted by a slot running from a peripheral portion of the lens to a central portion thereof.

4. A lens arrangement according to claim 1 wherein said objective lens comprises a single lens element.

5. A lens arrangement according to claim 1 wherein said objective lens comprises more than one lens element.

6. A lens arrangement according to claim 1 wherein said light flux deflection means comprises a prism movably mounted within said slot.

7. A lens arrangement according to claim 1 wherein said slot divides said lens into two separate and distinct lens portions.

8. A lens arrangement according to claim 1 wherein said light flux deflection means comprises a condenser lens for conducting and projecting the illuminating flux from said reflection surface of said deflection means.

9. A lens arrangement according to claim 8 wherein said condenser lens has a projection axis coincident with a central axis of said objective lens.

10. A lens arrangement according to claim 1 wherein said providing means comprises a light guide and a condenser lens for conducting illuminating light flux to said reflection surface of said light flux deflection means.

11. A lens arrangement according to claim 1 wherein said light flux deflection means is a prism including first and second reflection surfaces, and the illuminating light flux passes through said prism and is exited at said prism via said first and second reflection surfaces.

12. A single objective lens type binocular microscope comprising:
    an objective lens having a slotted portion;
    light flux deflection means disposed within a slot formed by said slotted portion, said deflection means having at least one reflection surface;
    means for providing an illuminating light flux at said reflection surface of said deflection means, the light flux passing through said deflection means and exiting at said deflection means via its reflection surface, said deflection means being so shaped and positioned that light flux exiting at said deflection means via its reflection surface illuminates a field of view along an axis of illumination that is approximately coaxial with a viewing axis of said objective lens; and
    a pair of observation lens systems, each of which has an ocular lens for observing an image of a field of view formed by said objective lens.

13. A single lens type binocular microscope according to claim 12 wherein each of said observation lens systems comprises a zoom lens system.

14. A single lens type binocular microscope according to claim 12 wherein said light flux deflection means is movably mounted in said slot.

15. A single lens type binocular microscope according to claim 12 wherein said slotted portion is constituted by a cut-out central portion of said objective lens.

16. A single lens type binocular microscope according to claim 12 wherein said slotted portion of the lens is constituted by a slot running from a peripheral portion of the lens to a central portion thereof.

17. A single lens type binocular microscope according to claim 12 wherein said slot divides said lens into two separate and distinct portions.

18. A single lens type binocular microscope according to claim 12 wherein said light flux deflection means comprises a condenser lens for conducting and projecting the illuminating light flux from said reflection surface of said deflection means.

19. A single lens type binocular microscope according to claim 12 wherein said light flux deflection means is a prism including first and second reflection surfacess, and the illuminating light flux passes through said prism and exits at said prism via said first and second reflection surfaces.

* * * * *